(12) United States Patent
Yang et al.

(10) Patent No.: US 6,900,623 B2
(45) Date of Patent: May 31, 2005

(54) POWER SUPPLY HAVING MULTI-VECTOR ERROR AMPLIFIER FOR POWER FACTOR CORRECTION

(75) Inventors: Ta-yung Yang, Milpitas, CA (US); Yi-Hsin Leu, Ilan (TW); Chern-Lin Chen, Taipei (TW); Jenn-yu G. Lin, Taipei (TW)

(73) Assignee: System General Corp., Taipei Hsien (TW)

( * ) Notice: Subject to any disclaimer, the term of this patent is extended or adjusted under 35 U.S.C. 154(b) by 139 days.

(21) Appl. No.: 10/617,515

(22) Filed: Jul. 10, 2003

(65) Prior Publication Data

US 2005/0007083 A1 Jan. 13, 2005

(51) Int. Cl.[7] .............................. G05F 1/40; G05F 1/56
(52) U.S. Cl. ...................................... 323/282; 323/273
(58) Field of Search ................................ 323/222, 224, 323/226, 268, 269, 271, 273, 275, 280, 281, 282–285

(56) References Cited

U.S. PATENT DOCUMENTS

| | | | | |
|---|---|---|---|---|
| 5,003,454 | A | * 3/1991 | Bruning | ........................ 363/81 |
| 5,614,810 | A | * 3/1997 | Nostwick et al. | ........... 323/207 |
| 5,619,405 | A | * 4/1997 | Kammiller et al. | ........... 363/80 |
| 5,742,151 | A | * 4/1998 | Hwang | ........................ 323/222 |
| 5,867,379 | A | * 2/1999 | Maksimovic et al. | .......... 363/89 |
| 6,531,854 | B2 | * 3/2003 | Hwang | ........................ 323/285 |
| 6,806,694 | B2 | * 10/2004 | Rupp et al. | .................. 323/282 |

* cited by examiner

Primary Examiner—Matthew V. Nguyen
(74) Attorney, Agent, or Firm—J.C. Patents

(57) ABSTRACT

A regulated power supply having power factor correction control includes a multi-vector error amplifier. The multi-vector error amplifier provides an error signal that is used to regulate a switching mechanism of the power supply. The multi-vector error amplifier acts to provide a low distortion error signal during steady-state operation, while responding rapidly and smoothly to sudden load changes.

18 Claims, 6 Drawing Sheets

POWER SUPPLY HAVING MULTI-VECTOR ERROR AMPLIFIER FOR POWER FACTOR CORRECTION

BACKGROUND OF THE INVENTION

1. Field of the Invention

The present invention generally relates to the art of power supplies and more particularly, to a regulated power supply with power factor correction (PFC) control.

2. Description of the Related Art

Regulated power supplies are used for power conversion in many applications, including computers, lighting ballasts, and telecommunications devices. Products consuming 70 watts or more generally require regulated power supplies with power factor correction, to reduce power loss and comply with environmental regulations. In these and other products where significant load variations are frequent, regulated power supplies capable of reacting rapidly to sudden load changes are especially desirable.

Without power factor correction, an AC/DC power conversion system will draw current through the rectifier in sharp bursts, shown in FIG. 1B. These high peak currents cause significant power losses due to heat dissipation. Furthermore, they can put heavy stress on the power distribution system and the transmission lines.

A power factor correction circuit can almost eliminate these current ripples by regulating the input current with a feedback control loop. The power factor correction circuit synchronizes the rectifier input current with the rectifier voltage output (FIG. 1A) and the power supply voltage output. The power supply can still provide the same constant voltage output power with a continuous and low-peak input current. FIG. 1C demonstrates a power supply's input current waveform with power factor correction. The lower peak currents enable the power supply to convert energy very efficiently, while minimizing the stress on the power distribution system and the transmission lines.

To generate a low distortion input current during steady-state operation, a regulated power supply needs a power factor correction section with a very low bandwidth error amplifier. The low bandwidth error amplifier filters out non-DC components from the power supply output voltage, so that they are not introduced back into the feedback control loop. Because the input to the power supply is an AC signal, the output, despite being a DC signal, will inevitably still contain an AC component. Within limits, this is acceptable on the output, but for the power output to remain stable, this component must be removed as much as possible from the feedback signal. Since the AC component is a low frequency signal (60–120 Hz), a very low bandwidth error amplifier is required in the power factor correction circuit to do this.

Regulated power supplies must also respond quickly to rapid transients. These can occur whenever the output load changes, the power supply turns on or off, and when the supply input is affected by glitches or surges. If the power supply does not react fast enough in these situations, the output voltage will also change, possibly beyond the predetermined operating range of the power supply. This can result in an untimely shut down and possible circuit damage.

Unfortunately, achieving low signal distortion and fast response have traditionally been conflicting goals of regulated power supply design. A power factor correction circuit with an error amplifier configured to provide low distortion will react very slowly to load changes. By the time the output of the power supply is corrected, either high or low voltage protection alarms will be reached, and the power supply will shut down. This is because a typical low bandwidth error amplifier filters out higher frequency signals from the feedback loop, meaning that it is a 'slow' component. While this is necessary for eliminating current distortion, it reduces the responsiveness of the power factor correction circuit.

Prior-art regulated power supply systems have attempted to address these conflicting goals by making compromises through the careful selection of components in the power factor correction circuit. However, such compromises make it impossible to simultaneously achieve optimum performance in current distortion and transient response. For the reasons described above, designing a power factor correction circuit that simultaneously provides low signal distortion and rapid transient response is fundamentally difficult. Low current distortion requires a 'slow' error amplifier, but rapid transient response requires a 'fast' error amplifier.

The challenge is to design an error amplifier for a power factor correction circuit that filters out AC component ripple during steady-state operation, while quickly and smoothly responding to sudden changes in the output load and the supply voltage. The ideal would be a flexible circuit that could detect rapid transients, and temporarily increase its control bandwidth in response without increasing gain.

One method of addressing this problem is disclosed in U.S. Pat. No. 5,619,405. Kammiller et al. discloses a power factor correction circuit with variable bandwidth control. The invention comprises of a variable resistance connected to an input of a low bandwidth amplifier, and control circuitry for switching the variable resistance in response to output conditions. When the control circuit senses a change in the output load, the resistance connected to the input of the low bandwidth amplifier can be decreased temporarily by a switching mechanism. This allows the feedback-control circuit to temporarily operate at a higher bandwidth for improved transient response.

One drawback of the Kammiller invention is that it fails to decouple steady-state operation from transient-mode operation. During steady-state operation, feedback signals pass through a low bandwidth amplifier. To allow control signals to propagate faster in response to rapid transients, Kammiller introduces a novel bandwidth control switching mechanism. This design can increase the overall speed of the feedback loop, but only to a limited degree. The output of the bandwidth control mechanism is connected in series to the input of the low bandwidth amplifier. Transient-mode feedback control signals are still severely bandwidth-limited by what is effectively a low-pass filter. The transient response of the circuit is still subject to limitations imposed by the requirements of steady-state operation.

Another drawback of the Kammiller invention is that it is prone to instability. The resistance switching mechanism claimed by Kammiller does increase the control bandwidth of the feedback loop whenever the output voltage exceeds steady-state boundaries. However, by reducing the resistance attached to the input of the low bandwidth amplifier at higher circuit frequencies, the resistance switching mechanism also increases the overall gain of the feedback circuit. FIG. 2A illustrates the gain characteristic of the Kammiller invention. It is well known to those skilled in the art that simultaneously increasing power gain and bandwidth tends to cause a feedback control system to become unstable. Thus, oscillations in the output voltage may be observed during on/off and load change transients. Furthermore, the said resistor switching mechanism will result in very abrupt and sudden transitions, further putting stress on the circuit and endangering stability. FIG. 3A illustrates the transient response of the Kammiller design.

Another drawback of the Kammiller invention is that the transient response is slow. The low bandwidth amplifier introduces a phase delay into the power factor correction control signal. The low bandwidth amplifier consists of an amplifier connected to a capacitance. Despite the resistance switching mechanism, transient feedback signals must still pass through this component and suffer a phase delay.

Another drawback of the Kammiller invention is high production cost. As explained above, the transient response of the Kammiller design is susceptible to instability. The maximum output voltage during transient-mode could be substantially higher than the steady-state output voltage. To cope with this, it would be necessary to use a bank capacitance with a high voltage rating on the output side of the power supply. If the power supply were built to output 385V–400V DC, it would be necessary to use a bank capacitance rated at 450V. The increased cost of this is very high relative to the overall cost of the circuit.

Finally, the Kammiller invention does not disclose how to build said resistor switching mechanism that its claims rely upon. There are no diagrams that show how to construct this component. Neither there is any detailed explanation or description in any of the preferred embodiments. Without knowing how to build the invention, it is difficult to assess. A simple way of designing the said switching mechanism is not known to the art. Any practical implementation of the variable resistance mechanism will be cumbersome and expensive relative to the overall cost of the circuit. Furthermore, the switching mechanism may introduce other complications that would need to be addressed. In the absence of a full disclosure of the method of constructing the said device, it is necessary to conclude that the Kammiller invention has not conclusively solved the problems described above.

It will be apparent to those skilled in the art that both of the preferred embodiments of the Kammiller invention exhibit the above stated shortcomings. Thus, a need still remains for a power factor correction circuit that provides low current distortion with a fast and stable transient response.

SUMMARY OF THE INVENTION

It is a general objective of the present invention to provide a multi-vector error amplifier for the power factor correction circuit of a regulated power supply, that will reduce distortion in the power output during steady-state operation, while correcting transient conditions rapidly and smoothly. This is to be accomplished by automatically increasing the control bandwidth of the multi-vector error amplifier, and decreasing the gain, whenever a load change or other transient condition occurs.

Another objective of the present invention is to overcome the disadvantages of prior-art inventions, stated above.

Another objective of the present invention is to provide a means of stabilizing current input that is decoupled from the means of correcting transient conditions, such that both can be optimized in practice. During steady-state operation, the feedback signal passes through a low bandwidth amplifier to filter out AC-component distortion from the control loop. When the control circuitry detects a significant change in the output voltage, indicating a load change or other transient condition, the feedback signal can automatically propagate through a high-bandwidth, low-gain voltage adder. The requirements of steady-state operation do not affect the performance of the circuit during transient-mode operation, and vice-versa.

Another objective of the present invention is to provide a multi-vector error amplifier with a rapid transient response. Transients can include load changes, power on/off, input glitches, and input surges. The present invention allows high frequency transient-mode feedback signals to propagate around the low bandwidth amplifier automatically, without incurring any significant phase delay.

Another objective of the present invention is to provide a multi-vector error amplifier with a soft, smooth transient response. When a change in operating conditions is detected, the present invention not only increases the control bandwidth of the feedback loop, but also simultaneously reduces the gain.

Another objective of the present invention is to reduce the production costs of a power factor correction circuit. The present invention accomplishes the preceding objectives with a simple design utilizing inexpensive components. Achieving a stable response to load changes allows the power supply to provide a tight DC output voltage. This permits the use of a bank capacitance with a relatively low voltage rating on the output of the power supply. Furthermore, the present invention can control bandwidth using little more than a few amplifiers and a voltage adder. It is well known to those skilled in the art that an inexpensive voltage adder can easily be built. Still further objects and advantages will become apparent from a consideration of the ensuing description and drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1A:
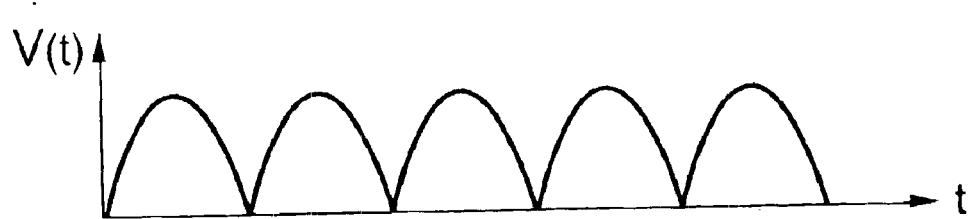
FIG. 1A is the voltage at the output of the bridge rectifier of the power supply.
Figure 1B:
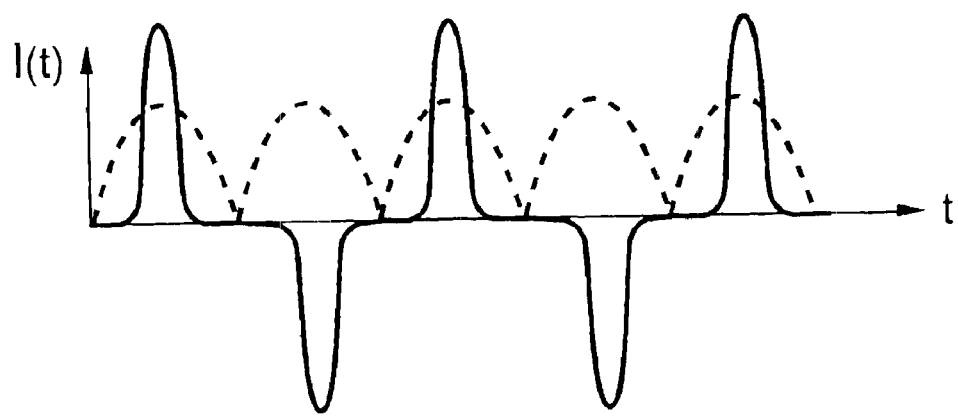
FIG. 1B is the input current signal of a power conversion circuit without power factor correction.
Figure 1C:
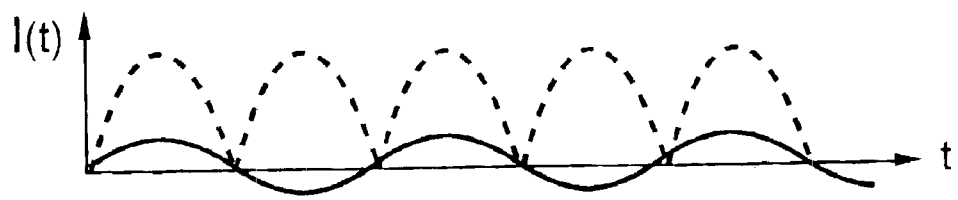
FIG. 1C is the input current signal of a power conversion circuit with power factor correction.
Figure 2B:
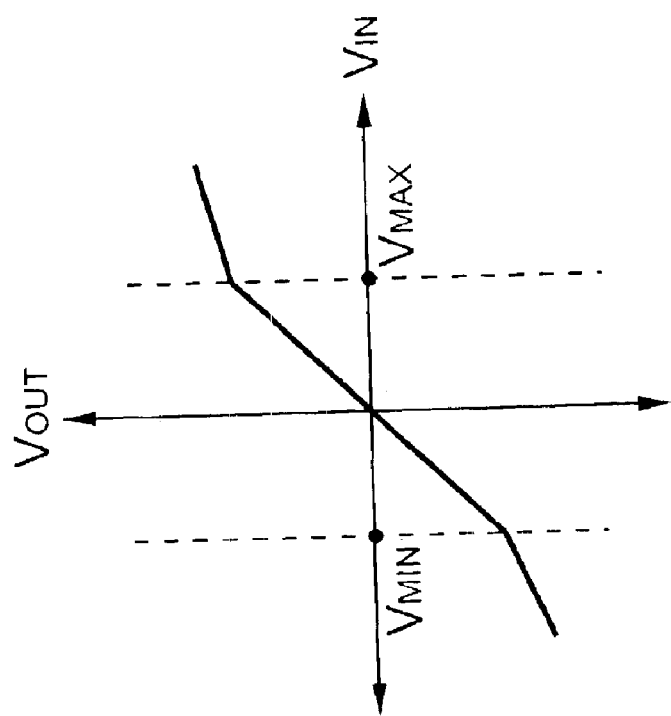
FIG. 2B shows the voltage gain characteristic of the multi-vector error amplifier.
Figure 2A:
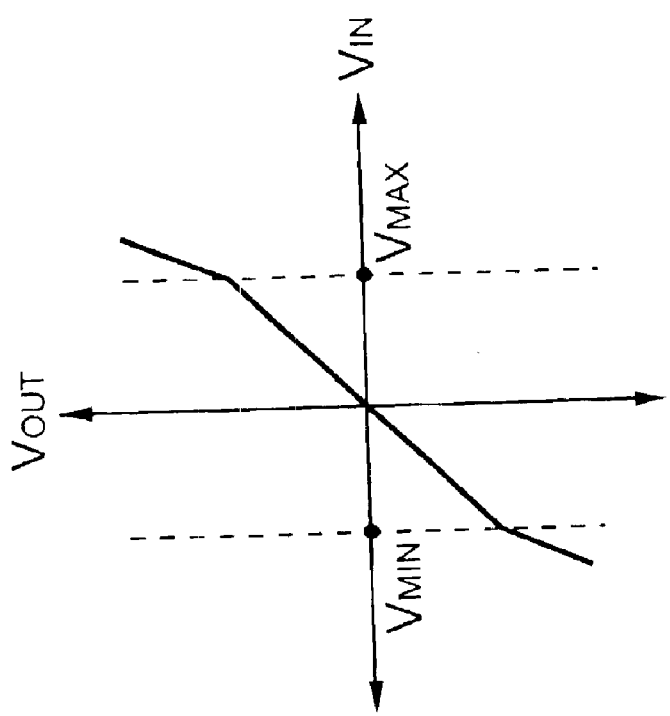
FIG. 2A shows the voltage gain characteristic of a prior-art error amplifier, Kammiller (U.S. Pat. No. 5,619,405).
Figure 3B:
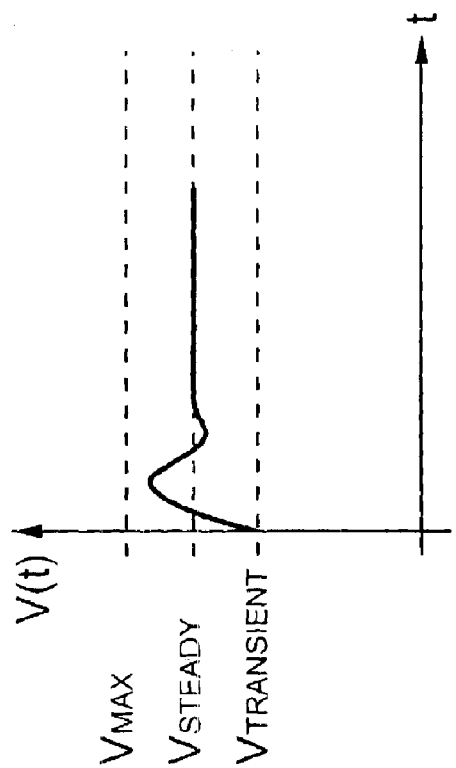
FIG. 3B shows the transient response of the multi-vector error amplifier.
Figure 3A:
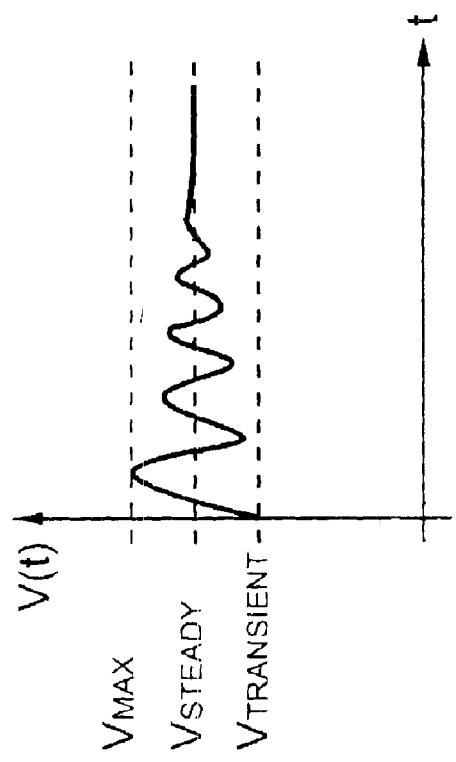
FIG. 3A shows the transient response of a prior-art error amplifier, Kammiller (U.S. Pat. No. 5,619,405).
Figure 4:
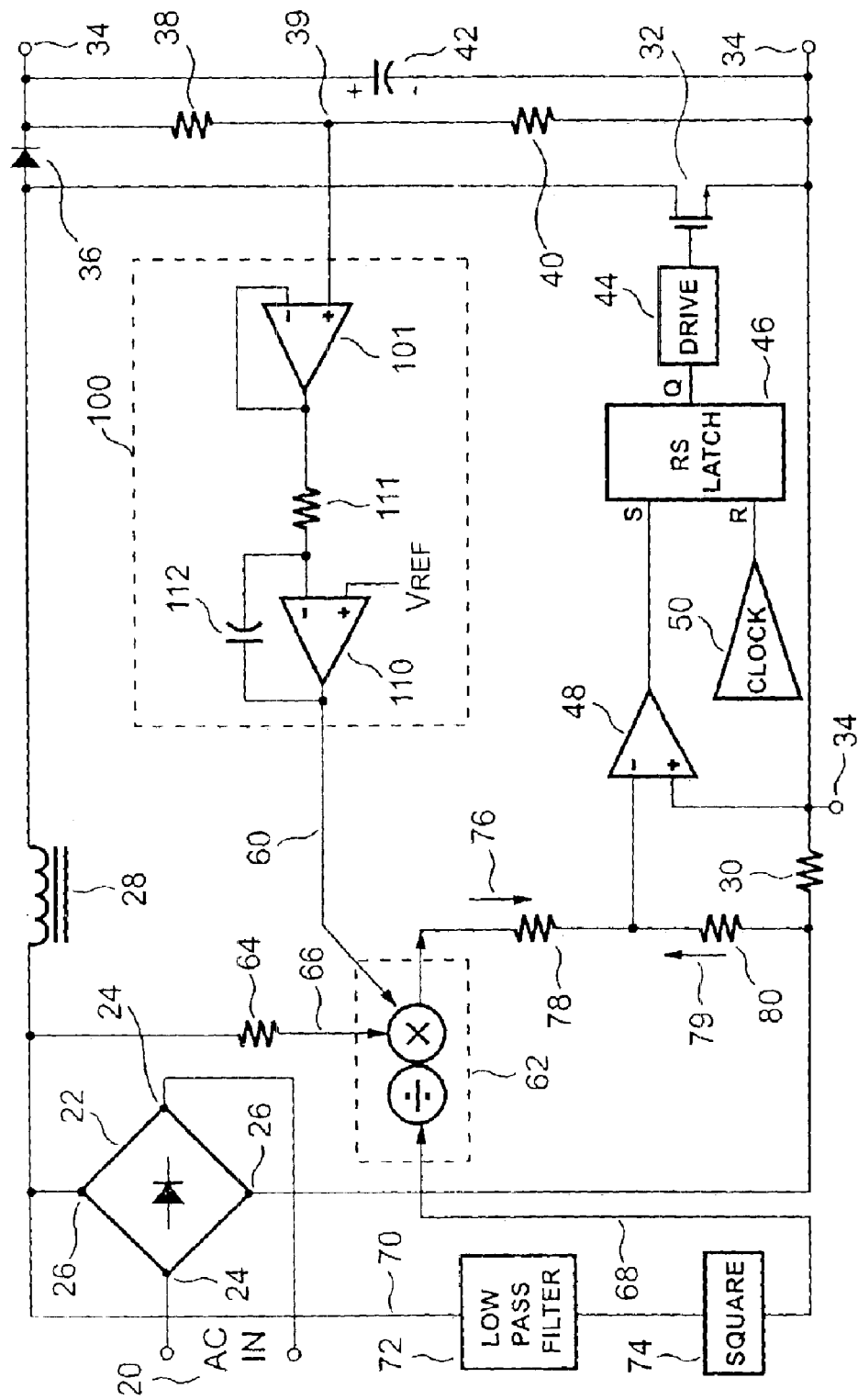
FIG. 4 shows a block diagram of a known regulated power supply with power factor correction.

Referring now to the drawings wherein the contents are for purposes of illustrating the preferred embodiment of the invention only and not for purposes of limiting same, FIG. 4 shows a block diagram of a known regulated power supply with power factor correction.

In this circuit, a bridge rectifier 22 receives an AC input signal 20 at an AC input 24. An output 26 of the bridge rectifier 22 is connected to an inductor 28 and a current-sense resistor 30. The inductor 28 and the current-sense resistor 30 are connected together to form a loop, through a switch 32. The switch 32 may be any of several components, including a FET switch or some other type of known switching device.

When the control circuitry closes the switch 32, the voltage from the bridge rectifier 22 is applied to the inductor 28. The current passing through the inductor 28 starts to increase. Eventually, the switch 32 opens and the current flowing through the inductor 28 flows through a diode 36 to charge a capacitor 42. The capacitor 42 is discharged when necessary by a load across a terminal pair 34. While it is conductive, the diode 36 keeps the capacitor 42 from discharging through the switch 32. The control signal for the switch 32 operates to maintain a nearly constant voltage at terminals 34. It is to be appreciated that while the output in this embodiment is 385 volts, other constant voltage outputs are possible.

The switch 32 is controlled by a drive circuit 44, which in turn receives its input from a control device such a RS latch. A set-input and a reset-input of a RS latch 46 are shown in this embodiment to be respectively coupled from a comparator 48 and a clock 50. The clock 50 generates a clock signal operating at approximately 100 KHz. The operation of these elements is known in the art and, therefore, does not need to be discussed in greater detail.

In this prior art embodiment a sample of the output voltage is sensed at a voltage divider location 39. The voltage divider location 39 is part of a high impedance divider network formed by a resistor 38 and a resistor 40. The voltage divider location 39 is connected to an input of a low bandwidth error amplifier block 100. The steady-state sensed output voltage of the voltage divider location 39 can be configured to be any value, but in this embodiment it is chosen to be 2.5 Volts.

The input of the low bandwidth error amplifier block 100 is connected to a buffer amplifier 101, to avoid loading the high impedance divider network. The output of the buffer amplifier 101 is provided to a negative input of an amplifier 110 via a resistor 111. A capacitive element 112 is connected from the negative input to an output of amplifier 110. The capacitive element 112 increases the impedance and reduces the bandwidth of the low bandwidth error amplifier block 100. It is to be appreciated that the error amplifier 110 may also be called an integrator, comparator, voltage comparator, voltage error amplifier, limited bandwidth amplifier, or other terms known in the art.

The sampled signal from the buffer amplifier 101 is compared in error amplifier 110 with a reference voltage $V_{REF}$ of 2.5 Volts. This comparison operation produces a voltage error signal 60, which is supplied to a multiplier/divider block 62. The multiplier/divider block 62 also receives, through a resistor 64, a line shape current 66 having the same shape as a rectified input voltage of the power supply. Also provided to the multiplier/divider block 62 is a magnitude input 68. The magnitude input 68 is a DC signal that is related to a RMS value of a supply line voltage, which can vary. The magnitude input signal 68 is created by passing a rectified line signal 70 first through a low pass filter 72 and then through a squarer 74, to obtain a DC signal related to the square of the supply line voltage.

The three inputs, the voltage error signal 60, the line shape current 66, and the magnitude input 68 are combined within multiplier/divider block 62 and converted to a current by a resistor 78. This forms an input current 76, which is the reference signal for the comparator 48, and which is applied to a negative input of comparator 48 via the resistor 78. The input current 76 is compared with a line input current 79. The line input current 79 creates a voltage across a resistor 30, which is converted to a current by a resistor 80 and applied to the negative input of the comparator 48. A positive input of the comparator 48 is tied to a ground point of the terminal pair 34. The control loop formed by the terminal pair 34, the resistor 38, the voltage divider location 39, the resistor 40, the low bandwidth error amplifier block 100, the voltage error signal 60, the multiplier/divider block 62, the resistor 64, the line shape current 66, the magnitude input 68, the rectified line signal 70, the low pass filter 72, the squarer 74, the input current 76, the resistor 78, the current 79, the resistor 80, the current-sense resistor 30, and the comparator 48, maintains a voltage at the junction of resistors 78 and the resistor 80, at the level of the ground point of the terminal pair 34.

As previously noted, an output of the comparator 48, clock 50, the RS latch 46, and the drive circuit 44 operates to provide a desired output voltage across the terminal pair 34, by controlling switch 32.

The power supply illustrated in FIG. 4 is designed to maintain a constant DC output voltage, such as 385 volts. The distortion in the output voltage signal must remain within acceptable limits, such as +10/−10 Volts. However, the terminal pair 34 is connected across the capacitive element 42, which is charged by a rectified current having a large 120 Hz component, so the voltage sensed at the voltage divider location 39 will still have a 120 Hz AC ripple component. If this AC component is included as part of the voltage error signal 60 and passed on to the multiplier/divider block 62, then the input current 76 will contain the undesirable distortion component from the waveform across the capacitive element 42. To avoid this, the voltage error signal 60 needs to be as close as possible to the pure DC component of the output signal. To accomplish this, the low bandwidth error amplifier block 100 must operate at a very low bandwidth to filter out AC signal components. However, this also results in a very slow response to load changes.

The DC voltage error signal 60 will be a constant DC voltage signal with different values, depending on load and input conditions. The very low bandwidth amplifier block 100 will filter out the AC component of the sampled voltage from the voltage divider location 39. This enables providing a voltage error signal 60 to multiplier/divider block 62, almost completely free of AC distortion. It is to be noted that no distortion is input by the line shape current 66 or the magnitude input 68.

A problem with the regulated power supply of FIG. 4 is that when a large fast load change occurs at the terminal pair 34, the low bandwidth error amplifier block 100 is too slow to follow the change. When a sudden load step occurs, it is desirable for the power supply to respond quickly by increasing or decreasing the output current, without allowing the output voltage level to change. One means for the low bandwidth error amplifier block 100 of achieving this, would be by increasing the speed of the response, by increasing bandwidth and correcting the voltage output level before it can change significantly. It is further desirable for this reaction to occur smoothly. While increasing bandwidth, the circuit should also reduce gain, in order to achieve a rapid and stable transient response. It should be further noted that the regulated power supply of FIG. 4 faces a similar problem when the input delivered to the power supply suddenly changes. This can happen either because the power supply is turned on/off, or because the input voltage experiences a glitch.

Figure 5:
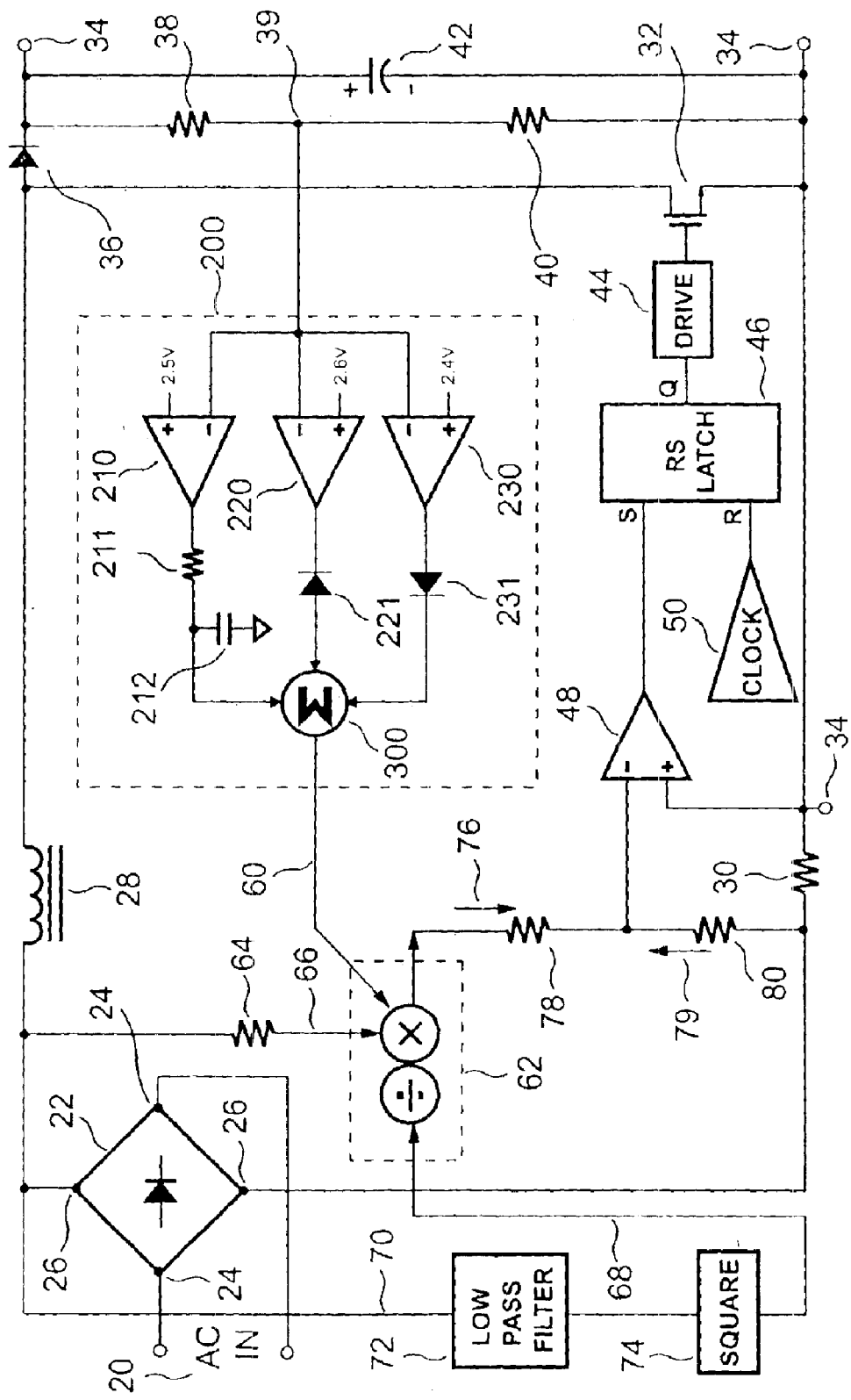
FIG. 5 shows a block diagram of a regulated power supply with power factor correction using a multi-vector error amplifier according to the present invention.

Therefore, with respect to a power supply with power factor correction, capable of providing an output signal with low distortion, and a rapid yet stable response to load and input changes, attention is directed to FIG. 5. Components similar or identical to those in FIG. 4 are assigned the same numbers. The present invention specifically relates to a multi-vector error amplifier block 200. This component replaces the low bandwidth error amplifier block 100 from FIG. 4, with the purpose of ensuring that the drive signal of the switch 32 will operate to provide a low distortion output, with a quick and stable response to load and input changes. An input of the multi-vector error amplifier block 200 is connected to the voltage divider location 39, and an output of the multi-vector error amplifier block 200 outputs the voltage error signal 60.

During steady-state operation, the circuit operates in a manner similar to that of the low bandwidth error amplifier 100 described above, so that the power factor control circuitry of the regulated power supply provides a low distortion output voltage. However, with respect to the multi-vector error amplifier block 200, additional elements are provided, so that the power supply responds quickly and smoothly to fast large load changes, and input transients. When the power supply is operating within acceptable steady-state parameters, the multi-vector error amplifier block 200 has a low bandwidth, thereby operating appropriately in a slow manner. When a large fast transient change occurs at the load or at the input, the output voltage will begin changing. At this point, operation of the multi-vector error amplifier block 200 will change automatically to a high bandwidth, low gain mode, to correct the change in the output voltage as soon as possible.

As long as operating conditions remain steady, the voltage divider location 39 will be very close to the reference voltage 2.5 Volts in this embodiment. This voltage divider location 39 is connected to an input of the multi-vector error amplifier block 200. As long as this voltage level remains stable, the multi-vector error amplifier will be equivalent to the low bandwidth error amplifier 100 of FIG. 4 in terms of its operation.

During steady-state operation the feedback signal will only be able to pass through an amplifier 210. A negative input of the amplifier 210 is connected to an input of the multi-error vector amplifier block 200, and a positive input of the amplifier is connected to a steady-state reference voltage of 2.5 Volts. An output of the amplifier 210 is connected to a voltage adder 300 via a resistor 211 and a shunt capacitor 212. An output of the voltage adder 300 is connected to the output of the multi-vector error amplifier block 200.

In this embodiment, to make error amplifier 210 slow changing, the resistor 211 and the shunt capacitor 212 can easily be made large enough, so that the combination of these components will have a bandwidth much lower than the AC frequency, such as 60 Hz. By configuring the multi-vector error amplifier block 200 in this manner, virtually zero AC ripple is allowed to pass through the multi-vector error amplifier. During steady-state operation, the output of the voltage adder 300 will only consist of this low bandwidth component from the feedback. The output of the voltage adder 300 becomes the voltage error signal 60, which will be sufficiently free of non-DC components to enable the power supply to produce a low interference output signal.

As previously discussed, however, it is common for power supplies to experience sudden load changes, and abrupt input transients. During these periods the low bandwidth error amplifier block 100 of FIG. 4 will not be able to maintain a constant voltage output, and therefore the regulated power supply will be in danger of entering a non-regulated state. The present invention speeds up the operation of the power factor correction subsection while improving stability, by adding extra components designed to handle transient conditions effectively.

The input of the multi-vector error amplifier block 200 is also connected to a negative input of an amplifier 220, used to detect sudden increases in the output voltage. A high reference voltage of 2.6 Volts is connected to a positive input of the amplifier 220. An output of the amplifier 220 is connected to a cathode of a diode 221. An anode of the diode 221 is connected to a second input of the voltage adder 300. When the sampled voltage at the divider location 39 exceeds the high reference voltage, the amplifier 220 will allow a high-bandwidth signal to pass through the diode 221 to the voltage adder 300, in the form of a negative current. The gain of this signal can be controlled through the selection of an appropriate amplifier component 220.

The input of multi-vector error amplifier block 200 is also connected to a negative input of an amplifier 230, used to detect sudden decreases in the output voltage. A low reference voltage of 2.4 Volts is connected to a positive input of the amplifier 230. An output of the amplifier 230 is connected to an anode of a diode 231. A cathode of the diode 231 is connected to a third input of the voltage adder 300. When the voltage at the divider location 39 dips below the low reference voltage, it will indicate that the output voltage is beginning to decrease. When the sampled voltage at the divider location 39 exceeds the low reference-voltage, the amplifier 230 will allow a high-bandwidth signal to pass through the diode 231 to the voltage adder 300. The gain of this signal can be controlled through the selection of an appropriate amplifier component 230.

These components are arranged so that when sudden changes in output/input conditions are detected, the feedback signal can propagate through a high bandwidth, low gain path, instead of the low bandwidth amplifier 210 section. When the power supply is in steady-state operation, these added components do not affect the remainder of the circuit, and it operates to reduce signal distortion, in a fashion similar to that of the prior art in FIG. 4.

Figure 6:
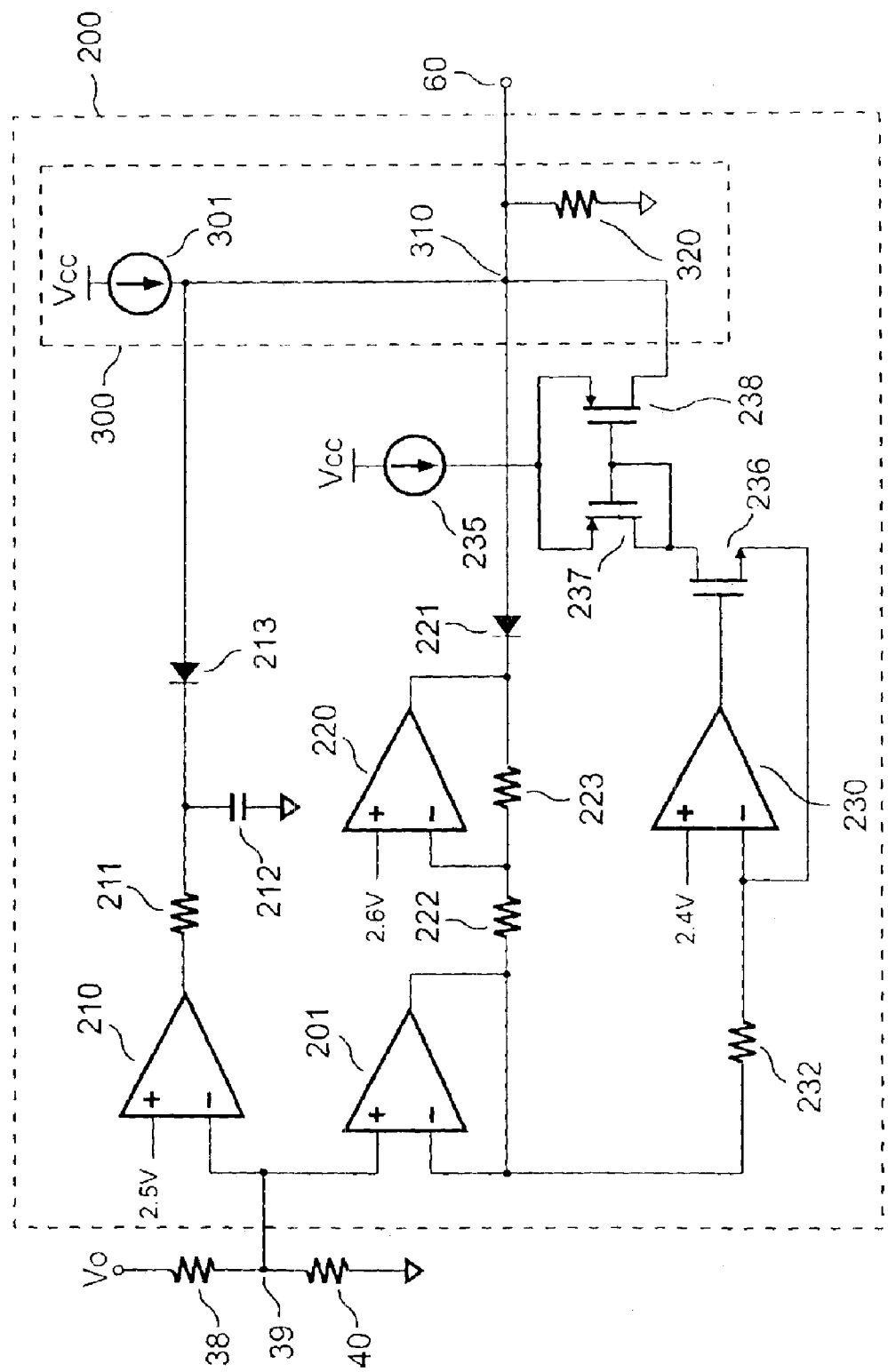
FIG. 6 shows a diagram of another embodiment of the multi-vector error amplifier used in the power factor correction circuitry according to the present invention.

It is to be understood that this constitutes an explanation of one possible method of constructing the multi-vector error amplifier block 200 according to the present invention. For another explanation of how to construct the multi-vector error amplifier block 200 according to the present invention, attention is turned to FIG. 6. This diagram shows another implementation of the multi-vector error amplifier block 200. Specifically, it includes some auxiliary components omitted from FIG. 5, and it demonstrates how to build the voltage adder 300.

The sampled voltage at the voltage divider location 39 is connected to an input of the multi-vector error amplifier block 200. A negative input of an amplifier 210 is connected to this input. A positive input of the amplifier 210 is connected to a steady-state reference voltage of 2.5 Volts. To keep the bandwidth of the multi-vector error amplifier block 200 low during steady-state operation, an output of the amplifier 210 is connected to a low pass filter consisting of a series resistor 211 and a shunt capacitor 212. The output of the low pass filter is connected to a cathode of a diode 213. The anode of the diode 213 is connected to a first input of the voltage adder 300. These components act to regulate the operation of the power supply during steady-state operation, in a manner similar to that of the embodiment described above.

The multi-vector error amplifier block 200 further includes an amplifier 220 and an amplifier 230, to enable a quick and stable response to sudden changes input/output changes. To avoid loading the high impedance divider network formed by resistors 38 and 40, the voltage divider location 39 is not connected directly to the amplifiers 220 and 230. Instead, the voltage divider location 39 is first connected to a positive input of a buffer amplifier 201. An output of the buffer amplifier 201 is connected back to a negative input of the buffer amplifier 201.

An amplifier 220 is a high reference-voltage amplifier. It is included so that the multi-vector error amplifier block 200 can react rapidly when the output voltage begins to increase. The output of the buffer amplifier 201 is connected to a negative input of the amplifier 220 via a resistor 222. In this embodiment, a positive input of the amplifier 220 is connected to a high reference voltage of 2.6 Volts. An output of the high reference-voltage amplifier 220 is connected to the negative input of the amplifier 220 via a resistor 223. The output of the high reference-voltage amplifier 220 is connected to a cathode of a diode 221. The anode of the diode 221 is connected to a second input of the voltage adder 300.

When the voltage at the voltage divider location 39 exceeds 2.6V, this indicates the output voltage of the power supply is increasing suddenly. The amplifier 220 will allow a high-bandwidth signal to pass through the diode 221 to the voltage adder 300, in the form of a negative current. This current will cause an output voltage of the voltage adder 300 to rapidly decrease, quickly reducing the switching frequency and the output voltage of the power supply. Adjusting the ratio of the resistor 222 and the resistor 223 can reduce the gain of this high-bandwidth signal.

An amplifier 230 is a low reference-voltage amplifier. It is included so that the multi-vector error amplifier block 200 can react appropriately when the output voltage begins to decrease suddenly. The output of the buffer amplifier 201 is connected to a negative input of the amplifier 230 through a resistor 232. In this embodiment, a positive input of the amplifier 230 is connected to a low reference voltage signal of 2.4 volts. An output of the low reference-voltage amplifier 230 is connected to a third input of the voltage adder 300 via a current mirror.

The current mirror mentioned above consists of a MOSFET 237 and a MOSFET 238. The output of the low reference-voltage amplifier 230 is connected to a gate of a MOSFET 236. The negative input of the amplifier 230 is connected to a source of the MOSFET 236. A drain of the MOSFET 236 is connected to a drain of the MOSFET 237, a gate of the MOSFET 237, and a gate of the MOSFET 238. A source of the MOSFET 237 and a source of the MOSFET 238 are tied together, and connected to the current source 235. A drain of the MOSFET 238 connects to the third input of the voltage adder 300. The operation of current mirrors is known in the art and, therefore, does not need to be discussed in greater detail.

When the voltage at the voltage divider location 39 goes below 2.4V, this indicates the output voltage of the power supply is decreasing suddenly. The amplifier 230 will allow a high-bandwidth signal to pass through the current mirror to the voltage adder 300. This current will cause the output voltage of the voltage adder 300 to quickly increase, rapidly increasing the switching frequency of the power supply, and quickly increasing the output voltage of the power supply. Increasing the resistor 232 can reduce the gain of this high-bandwidth signal.

The voltage adder 300 includes three inputs, a current source 301, a current junction point 310 and a shunt resistor 320. The current source 301 acts as a bias for the voltage adder 300. The voltage adder 300 sums up the currents of the three inputs at the current junction point 310. The current junction 310 is connected to the output of the multi-vector error amplifier block 200. The shunt resistor 320 connected to the multi-vector error amplifier block 200 turns the output of the current junction point 310 into a voltage signal. This output of the voltage adder 300 becomes the output of the multi-vector error amplifier block 200 and the voltage error signal 60.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims or their equivalents.

What is claimed is:

1. A regulated power supply having power factor control comprising:
   a sample voltage linearly related to an output voltage of said regulated power supply; and
   a multi-vector error amplifier for automatically amplifying said sample voltage at different gains and bandwidths depending on said sample voltage, comprising:
   a voltage adder for adding at least three voltage signals;
   a steady-state reference-voltage amplifier, wherein an output of said steady-state reference-voltage amplifier is connected via a low pass filter to a first input of said voltage adder;
   a low reference-voltage amplifier, wherein an output of said low reference-voltage amplifier is connected via a first diode to a second input of said voltage adder; and
   a high reference-voltage amplifier, wherein an output of said high reference-voltage amplifier is connected via a second diode to a third input of said voltage adder.

2. The regulated power supply according to claim 1, wherein said steady-state reference-voltage amplifier further comprises a negative input connected to said sample voltage and a positive input connected to a steady-state reference-voltage.

3. The regulated power supply according to claim 1, wherein said low reference-voltage amplifier further comprises a negative input connected to said sample voltage and a positive input connected to a low reference-voltage, and wherein said low reference-voltage is distinctly lower than said steady-state reference-voltage supplied to said steady-state reference-voltage amplifier.

4. The regulated power supply according to claim 1, wherein said high reference-voltage amplifier further comprises a negative input connected to said sample voltage and a positive input connected to a high reference-voltage, and wherein said high reference-voltage is distinctly higher than said steady-state reference-voltage supplied to said steady-state reference-voltage amplifier.

5. The regulated power supply according to claim 1, wherein the bandwidth of said multi-vector error amplifier is significantly less than the frequency of an input power of the power supply when said sample voltage is less than said high-reference voltage and greater than said low-reference voltage.

6. The regulated power supply according to claim 1, wherein the bandwidth of said multi-vector error amplifier increases significantly and the gain of said multi-vector error amplifier decreases significantly when said sample voltage exceeds said high-reference voltage or decreases below said low-reference voltage.

7. A regulated power supply having power factor control comprising:
- a sample voltage linearly related to an output voltage of said power supply; and
- a multi-vector error amplifier for automatically amplifying said sample voltage at different gains and bandwidths depending on said sample voltage, comprising:
  - a voltage adder for adding at least three voltage signals;
  - a current mirror;
  - a first current source;
  - a steady-state reference-voltage amplifier, wherein an output of said steady-state reference-voltage amplifier is connected via a low pass filter and a first diode to a first input of said voltage adder;
  - a high reference-voltage amplifier, wherein an output of said high reference-voltage amplifier is connected via a second diode to a second input of said voltage adder;
  - a low reference-voltage amplifier, wherein an output of said low reference-voltage amplifier is connected via a current mirror to a third input of said voltage adder; and
  - a buffer amplifier, wherein an input of said buffer amplifier is coupled to said sample voltage.

8. The regulated power supply according to claim 7, wherein said steady-state voltage amplifier further comprises a negative input connected to said sample voltage and a positive input connected to a steady-state reference-voltage.

9. The regulated power supply according to claim 7, wherein said low pass filter includes a first resistor and a capacitor.

10. The regulated power supply according to claim 7, wherein said buffer amplifier further comprises a negative input connected to an output of said buffer amplifier.

11. The regulated power supply according to claim 7, wherein said high reference-voltage amplifier further comprises a positive input connected to a high reference-voltage, and wherein said high reference-voltage is distinctly higher than the steady-state reference-voltage supplied to said steady-state reference-voltage amplifier.

12. The regulated power supply according to claim 7, wherein said high reference-voltage amplifier further comprises a negative input connected to an output of said buffer amplifier via a second resistor, and wherein said negative input is further connected to said output of said high reference-voltage amplifier via a third resistor.

13. The regulated power supply according to claim 7, wherein said low reference-voltage amplifier further comprises a positive input connected to a low reference-voltage, and wherein the low reference-voltage is distinctly lower than the steady-state reference-voltage supplied to said steady-state reference-voltage amplifier.

14. The regulated power supply according to claim 7, wherein said low reference-voltage amplifier further comprises a negative input connected to said output of said buffer amplifier via a fourth resistor.

15. The regulated power supply according to claim 7, wherein said voltage adder comprises:
- a second current source connected to a current junction;
- a first input connected to said current junction;
- a second input connected to said current junction;
- a third input connected to said current junction; and
- a means for converting a current into a voltage signal connected to said current junction and an output of said voltage adder.

16. The regulated power supply according to claim 7, wherein said means for converting a current into a voltage signal includes a fifth resistor connected to the ground reference.

17. The regulated power supply according to claim 7, wherein the bandwidth of said multi-vector error amplifier is significantly less than the frequency of an input power of the power supply when said sample voltage is less than said high-reference voltage and greater than said low-reference voltage.

18. The regulated power supply according to claim 7, wherein the bandwidth of said multi-vector error amplifier increases significantly and the gain of said multi-vector error amplifier decreases significantly when said sample voltage exceeds said high-reference voltage or decreases below said low-reference voltage.

* * * * *